(12) United States Patent
Oshima et al.

(10) Patent No.: US 11,113,017 B2
(45) Date of Patent: Sep. 7, 2021

(54) ELECTRONIC DEVICE, IMAGE READING METHOD, AND PRINT PROCESSING METHOD

(71) Applicant: SEIKO EPSON CORPORATION, Tokyo (JP)

(72) Inventors: Yasuhiro Oshima, Matsumoto (JP); Yasuhiro Furuta, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/691,034

(22) Filed: Nov. 21, 2019

(65) Prior Publication Data

US 2020/0167111 A1 May 28, 2020

(30) Foreign Application Priority Data

Nov. 26, 2018 (JP) .............................. JP2018-219988

(51) Int. Cl.
*G06F 3/12* (2006.01)
*H04N 1/00* (2006.01)

(52) U.S. Cl.
CPC .......... *G06F 3/1288* (2013.01); *G06F 3/1287* (2013.01); *H04N 1/00973* (2013.01)

(58) Field of Classification Search
CPC .. G06F 3/1288; G06F 3/1287; H04N 1/00973
See application file for complete search history.

(56) References Cited

U.S. PATENT DOCUMENTS

| | | | |
|---|---|---|---|
| 7,957,021 B2 | 6/2011 | Moroi | |
| 2004/0143651 A1* | 7/2004 | Allen | H04L 67/34 709/221 |
| 2005/0270564 A1* | 12/2005 | Yun | G03G 21/02 358/1.15 |
| 2012/0026548 A1* | 2/2012 | Nakagawa | G06F 3/1228 358/1.15 |
| 2012/0307300 A1* | 12/2012 | Takano | H04N 1/00217 358/1.15 |
| 2013/0003115 A1* | 1/2013 | Uchikawa | G06F 3/1288 358/1.15 |
| 2013/0094053 A1* | 4/2013 | Shirai | G06F 3/1222 358/1.15 |
| 2013/0242331 A1* | 9/2013 | Ando | H04N 1/00973 358/1.13 |
| 2015/0324159 A1* | 11/2015 | Sugaya | G06F 16/00 358/1.15 |
| 2017/0257510 A1 | 9/2017 | Kuroyanagi et al. | |
| 2017/0262907 A1* | 9/2017 | Nakatani | G06Q 30/04 |
| 2017/0310849 A1* | 10/2017 | Hosoda | G06F 3/1236 |
| 2018/0198930 A1* | 7/2018 | Tokiwa | H04N 1/00244 |

FOREIGN PATENT DOCUMENTS

| | | |
|---|---|---|
| CN | 107155014 | 9/2017 |
| JP | 2011-151849 A | 8/2011 |

\* cited by examiner

*Primary Examiner* — Moustapha Diaby
(74) *Attorney, Agent, or Firm* — Workman Nydegger

(57) ABSTRACT

An electronic device causes an image reading unit to start a scan process when a web API for scan start request is invoked by a process of a web browser configured to communicate with a server system.

15 Claims, 8 Drawing Sheets

FIG. 6

```
<html>
<head>
    <title>Scan</title>   B1
    <script>
            function scan() {
                    xhr = new XMLHttpRequest();    B2
                    ⋮
                    xhr.open('POST', 'http://192.0.2.1/WDP/SCAN');
                    ⋮
                    xhr.send('xxx');
            }
    </script>                    B3
</head>
<body>                    B4
    <h1>Scan</h1>
    <button onclick="scan()">Scan</button>
</body>
</html>
```

ELECTRONIC DEVICE, IMAGE READING METHOD, AND PRINT PROCESSING METHOD

The present application is based on, and claims priority from JP Application Serial Number 2018-219988, filed Nov. 26, 2018, the disclosure of which is hereby incorporated by reference herein in its entirety.

BACKGROUND

1. Technical Field

The present disclosure relates to an electronic device, an image reading method, and a print processing method.

2. Related Art

Multifunction peripherals (MFP) having multiple functions such as a print function, a scan function, or the like are widely known. For example, JP-A-2011-151849 discloses a scheme of using a function of an MFP from a device such as a server system. Software of the MFP of JP-A-2011-151849 includes a browser that can interpret a script extended to control the hardware of the MFP. Such a browser controls the hardware of the MFP by acquiring HyperText Markup Language (HTML) data including a script from a server system in which a web application is implemented.

In the scheme of JP-A-2011-151849, a scripting API for using a function of an MFP is provided in a browser. Thus, a web application for using the function is unable to run in a conventional browser. Since a dedicated browser is used, there is a problem of a large burden in developing such a browser.

SUMMARY

According to an aspect of the present disclosure, an electronic device includes: a communication unit; a processing unit that controls the communication unit; and an image reading unit, and the processing unit causes the image reading unit to start a scan process in accordance with a web application programming interface (Web API) for scan start request when the web API for scan start request provided by an electronic device is invoked by a process of a web browser configured to communicate with a server system and causes the communication unit to transmit scan data acquired by the image reading unit to the server system.

BRIEF DESCRIPTION OF THE DRAWINGS

FIG. 6 is an example of HTML data related to a web API invocation.

DESCRIPTION OF EXEMPLARY EMBODIMENTS

Preferred embodiments of the present disclosure will be described below in detail. Note that the embodiments described below are not intended to unduly limit the scope of the present disclosure recited in the claims.

1. Example of System Configuration

Figure 1:
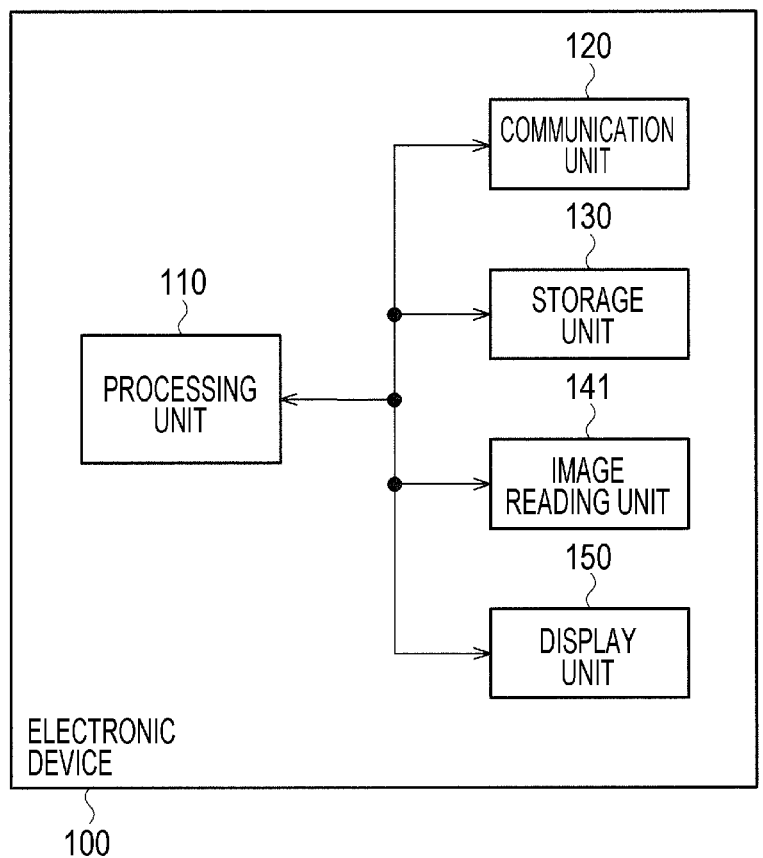
FIG. 1 is a configuration example of an electronic device.

FIG. 1 illustrates a configuration example of an electronic device 100. The electronic device 100 includes a processing unit 110, a communication unit 120, a storage unit 130, an image reading unit 141, and a display unit 150, that is, FIG. 1 illustrates a configuration example of the electronic device 100 that is a scanner. However, the electronic device 100 is not limited to the configuration of FIG. 1, and various modifications are possible; for example, some of the above components may be omitted, or another component may be added.

The processing unit 110 controls each component of the electronic device 100. For example, the processing unit 110 may include a plurality of central processing units (CPU) such as a main CPU and a sub-CPU or may include a micro-processing unit (MPU). The main CPU performs control of each component or overall control of the electronic device 100. The sub-CPU performs various processing for reading an image, for example. Alternatively, a CPU used for communication processing may be further provided.

The processing unit 110 is formed of hardware described below. The hardware may include at least one of a circuit that processes a digital signal and a circuit that processes an analog signal. For example, the hardware may be formed of one or more circuit devices or one or more circuit elements implemented on a circuit board. The one or more circuit devices may be, for example, an IC or the like. The one or more circuit elements may be, for example, a resistor, a capacitor, or the like.

The processing unit 110 may be implemented by a processor described below. The electronic device 100 of the present embodiment includes a memory device that stores information and a processor that operates in accordance with information stored in the memory device. The information may be, for example, a program, various data, and the like. The processor includes a hardware component. The processor may be implemented by using various processors such as a CPU, a graphics processing unit (GPU), a digital signal processor (DSP), or the like. The memory device may be semiconductor memory such as static random access memory (SRAM) or dynamic random access memory (DRAM), a register, a magnetic storage device such as a hard disk device (hard disk drive (HDD)), or an optical storage device such as an optical disk device. For example, the memory device stores a computer-readable instruction therein and, when the instruction is executed by a processor, the function of each component of the electronic device 100 is implemented as a process. An instruction as used herein may be an instruction of a set of instructions forming a program or may be an instruction that instructs a hardware circuit in the processor to operate.

The communication unit 120 communicates with other devices each including a server system 200 via a network. A network as described later as a first network NW1 and a second network NW2 in FIG. 3 and as mentioned herein may be implemented as a wide area network (WAN), a local area network (LAN), or the like and may be a wired network or a wireless network. Specifically, the communication unit 120 is a chip or a module that performs wired communication or wireless communication, a connector connected to a cable used for wired communication, or an antenna used for wireless communication. Note that, in a processing system 10 described below in accordance with FIG. 5, when a web browser 300 implemented in the electronic device 100 accesses itself, the communication unit 120 of the electronic device 100 allows the access. That is, the communication unit 120 may perform communication in accordance with a given communication protocol in the electronic device 100, and the communication performed by the communication unit 120 is not limited to communication via a network such as the first network NW1.

The storage unit 130 stores various information such as data, a program, or the like. The processing unit 110 and the communication unit 120 operate by using the storage unit 130 as a work area, for example. The storage unit 130 may be semiconductor memory, a register, a magnetic storage device, or an optical storage device.

The image reading unit 141 includes a transport mechanism that transports a plurality of sheets mounted on a mount face one by one along a transportation path. For example, the transport mechanism includes a pair of transport rollers used for transporting a sheet. The pair of transport rollers are formed of a driving roller and a driven roller, for example. Further, the image reading unit 141 includes a light source and an image sensor. The light source is formed of a light-emitting diode (LED), a fluorescent lamp, or the like, for example. The image sensor receives reflected light emitted from a light source and reflected by an object to be read, such as a manuscript, converts the received light into an electric signal, and outputs an image signal having a value in accordance with the amount of the received light. The image sensor is a linear image sensor, for example. Note that a specific configuration of the image reading unit 141 is not limited to that illustrated in this example, and various modifications are possible.

The display unit 150 is formed of a display or the like that displays various information to the user. The display unit 150 may be, for example, a touchscreen and may serve as an operating interface that accepts an entry operation from a user.

Figure 2:
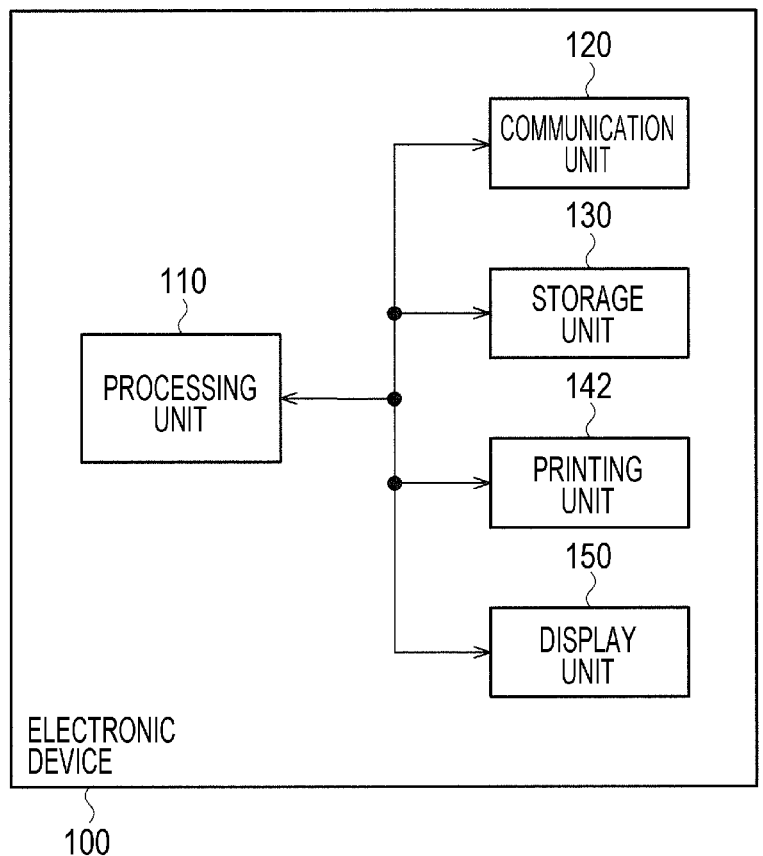
FIG. 2 is another configuration example of an electronic device.

FIG. 2 illustrates another configuration example of the electronic device 100. The electronic device 100 includes the processing unit 110, the communication unit 120, the storage unit 130, a printing unit 142, and the display unit 150. That is, FIG. 2 illustrates a configuration example of the electronic device 100 that is a printer device. However, the electronic device 100 is not limited to the configuration of FIG. 2, and various modifications are possible; for example, some of the above components may be omitted, or another component may be added. Note that, since the communication unit 120, the storage unit 130, and the display unit 150 are the same as those in FIG. 1, detailed description thereof will be omitted. Further, since the processing unit 110 is the same as that of FIG. 1 except for performing control related to printing, detailed description thereof will be omitted.

The printing unit 142 includes a printer engine. A printer engine refers to a mechanical arrangement that performs printing of an image on a printing medium. For example, the printer engine includes a transport mechanism, an ink jet discharge head, a drive mechanism of a carriage including the discharge head, or the like. The printer engine causes the discharge head to discharge ink onto a printing medium transported by the transport mechanism and thereby prints an image on the printing medium. Various media such as paper, cloth, or the like may be used as a printing medium. Note that the specific configuration of the printer engine is not limited to that illustrated in this example, and printing may be performed by using toner in an electrophotography scheme.

As illustrated in FIG. 1 and FIG. 2, the electronic device 100 may be a scanner or may be a printer. Alternatively, the electronic device 100 may be an MFP having multiple functions. An MFP may include a facsimile function, a copy function, or the like in addition to a print function or a scan function.

Figure 3:
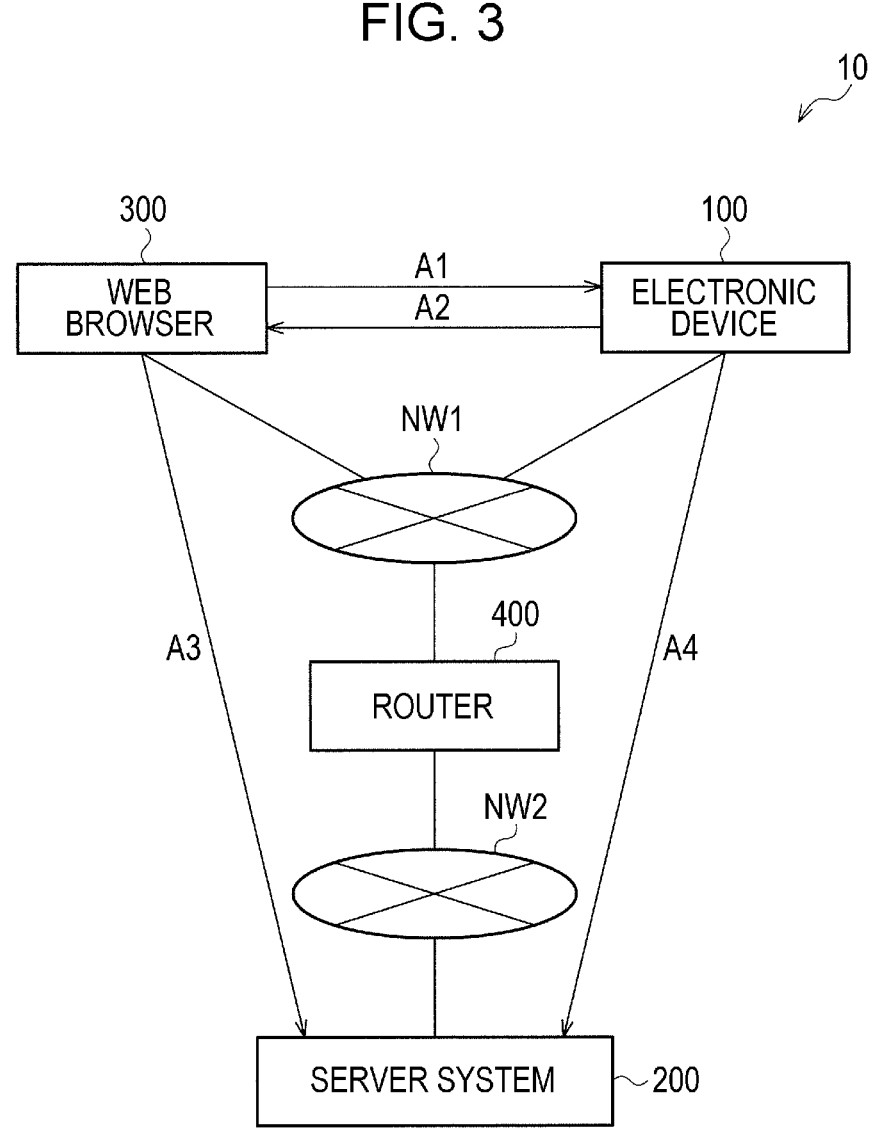
FIG. 3 is a configuration example of a processing system including the electronic device.

FIG. 3 illustrates a configuration example of the processing system 10 including the electronic device 100 according to the present embodiment. The processing system 10 includes the electronic device 100, the server system 200, the web browser 300, and a router 400. Note that, as described below in accordance with FIG. 4 and FIG. 5, various modifications can be made to a device in which the web browser 300 is implemented, and there is no obstacle for the electronic device 100 to include the web browser 300.

The electronic device 100 and the web browser 300 are connected to the first network NW1. The first network NW1 is a LAN, for example. Specifically, the first network NW1 may be an intranet. The server system 200 is connected to the second network NW2. The second network NW2 is a public communications network such as the Internet. The router 400 is provided between the first network NW1 and the second network NW2.

Schemes to control hardware of the electronic device 100 from the server system 200 are widely known. In the case of the electronic device 100 illustrated in FIG. 1, the server system 200 uses a scan function by controlling the image reading unit 141 of the electronic device 100. In the case of the electronic device 100 illustrated in FIG. 2, the server system 200 uses a print function by controlling the printing unit 142.

When the server system 200 is not used, firmware of the electronic device 100 needs to be updated to extend the functionality of the electronic device 100, and this results in a large burden of development and maintenance. In contrast, with an additional function being implemented as an application of the server system 200, extension of the functionality of the electronic device 100 is facilitated. An application of the server system 200 may be a web application, for example. The extended functionality may be, for example, a user authentication function described below in accordance with FIG. 7. With such an implementation, it is possible to realize authentication scanning or authentication printing while suppressing an update process on the electronic device 100 side.

However, the server system 200 assumed in the present embodiment is coupled to the second network NW2 that is different from the first network NW1 to which the electronic device 100 is coupled, as illustrated in FIG. 3. In an enterprise, a firewall is often installed to secure confidential information and personal information against being exposed by an external attack via a network. A firewall controls external access from the Internet to an internal Intranet. For example, only Hypertext Transfer Protocol (HTTP) or Hypertext Transfer Protocol Secure (HTTPS) is allowed when accessing the Internet from an internal intranet, and all external access from the Internet to the intranet is blocked. Specifically, access by using HTTP corresponds to access using port 80, and access by HTTPS corresponds to access using port 443. That is, while access from a device on an intranet to a server system on the Internet is allowed, access from a server system on the Internet to a device on an intranet is blocked by the firewall.

In the example of FIG. 3, access indicated by A4 from the electronic device 100 to the server system 200 and a response to such access are allowed. However, active access from the server system 200 to the electronic device 100 is blocked by a firewall provided in the router 400. With the server system 200 being arranged to be coupled to the first network NW1, access from the server system 200 to the electronic device 100 is allowed. Therefore, the print function of the electronic device 100 can be used from the server system 200 by using the same scheme as a general control scheme used when a personal computer (PC) provides a print instruction to a printer. Similarly, with the server system 200 being arranged to be coupled to the first network NW1, the scan function of the electronic device 100 can be easily used from the server system 200. In the scheme of the present embodiment, however, it is difficult to directly apply such a widely used control scheme.

Therefore, in the scheme of the present embodiment, the web browser 300 that can communicate with the electronic device 100 indicated by A1 and communicate with the server system 200 indicated by A3 is used. That is, the hardware of the electronic device 100 is controlled by a routing arrangement in which the server system 200 communicates via the web browser 300.

A scheme to control an MFP by using a browser is disclosed in JP-A-2011-151849, for example. In the scheme of JP-A-2011-151849, however, a scripting API for using the function of an MFP is provided. In other words, a browser program in JP-A-2011-151849 is created to directly operate the MFP program. Thus, in the scheme of JP-A-2011-151849, a standard browser that supports a standard script is not useful, and a dedicated browser that can support an extended script has to be used. This results in a large burden in developing the dedicated browser.

Further, the use of a dedicated browser increases the burden of development on the server side, that is, a burden in developing a web application. This is because the dedicated browser in JP-A-2011-151849 is to operate a program of the MFP as described above. Thus, to check the actual operation of an MFP via a web application, it is necessary to prepare an environment in which such a dedicated browser is installed in the MFP. Further, since the operation of a dedicated browser is closely coupled to the firmware of the MFP, it may be necessary to use debug software dedicated to the MFP when debugging. Since an entity other than an MFP maker may develop a web application, there may be many cases where debug software is unavailable to a developer. In such a case, it is difficult to use a procedure such as checking the operation of an MFP while sequentially stopping execution of a program, and efficient development of a web application is therefore not easy.

In contrast to such a traditional scheme, the electronic device 100 according to the present embodiment includes the communication unit 120, the processing unit 110 that controls the communication unit 120, and the image reading unit 141, as illustrated in FIG. 1. The processing unit 110 causes the image reading unit 141 to start a scan process in accordance with a web API for scan start request when the web API for scan start request provided by the electronic device 100 is invoked in accordance with a process performed by the web browser 300 that can communicate with the server system 200. The processing unit 110 then causes the communication unit 120 to transmit scan data acquired by the image reading unit 141 to the server system 200. Scan data as used herein is image data acquired as a result of a scan process.

Alternatively, the electronic device 100 according to the present embodiment includes the communication unit 120, the processing unit 110 that controls the communication unit 120, and the printing unit 142, as illustrated in FIG. 2. The processing unit 110 causes the printing unit 142 to start a print process of printing print data in accordance with a web API for print request when the web API for print request provided by the electronic device 100 is invoked in accordance with a process performed by the web browser 300 that can communicate with the server system 200 that accumulates print data. Herein, print data includes print image data that is an image to be printed. Further, print data may include information other than an image, such as printer settings information. Further, the server system 200 may perform a conversion process on print data when transmitting the print data accumulated therein, and the print data in the present embodiment includes data obtained after the conversion process.

As discussed above, in the scheme of the present embodiment, a web API used for accessing the scan function or the print function of the electronic device 100 is provided in the electronic device 100. A web API corresponds to an interface for invoking a function by which the web browser 300 invokes the scan function, the print function, or the like of the electronic device 100 through HTTP- or HTTPS-based communication. Accordingly, scanning or printing can be managed via a browser from the server system 200 provided on the second network NW2 that is different from the first network NW1 on which the electronic device 100 is provided. Since the web API is supported by widely used standard browsers, there is an advantage of eliminating the use of a dedicated browser. Standard browsers are not closely coupled to the electronic device 100. Therefore, the web browser 300 in the present embodiment is not required to be implemented in the electronic device 100.

Figure 4:
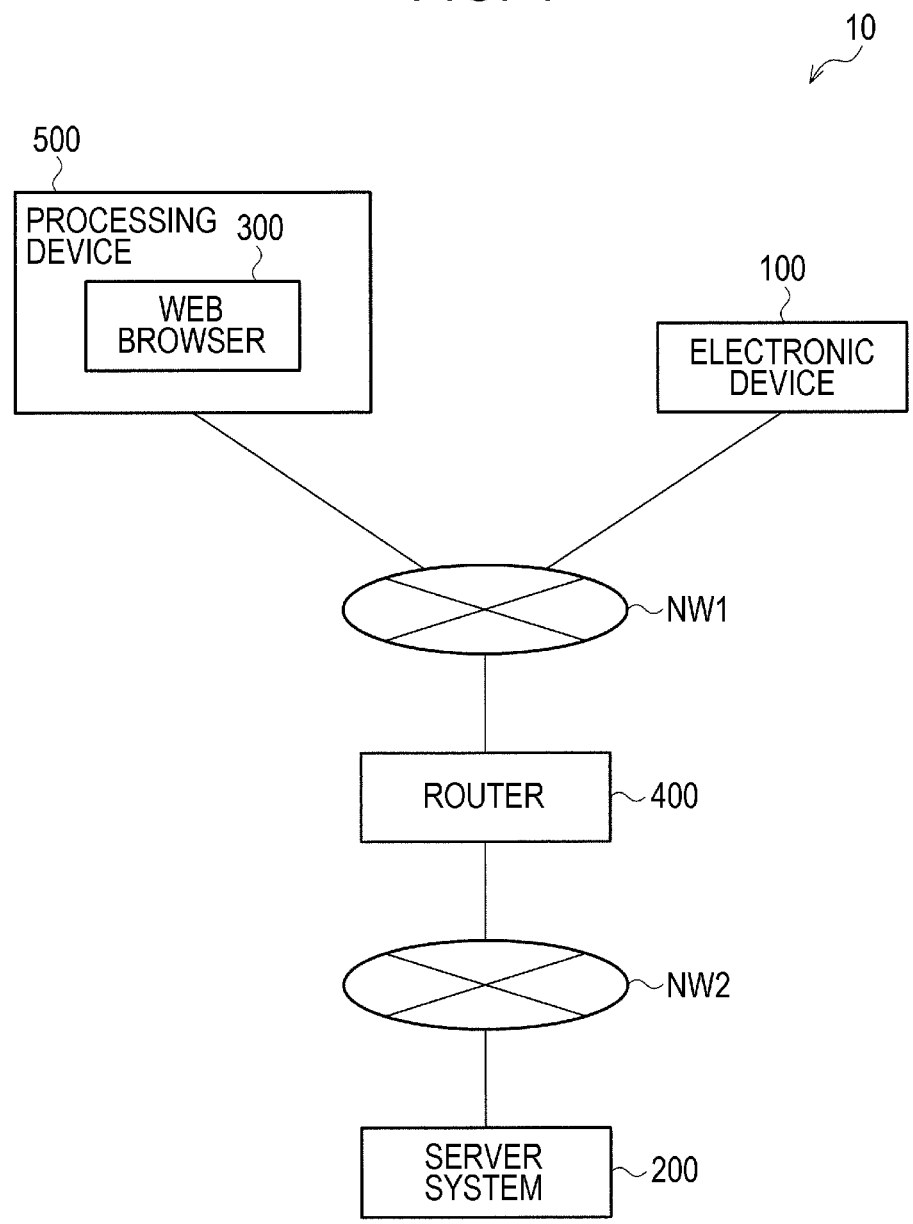
FIG. 4 is a configuration example of a processing system when a web browser is included in an external device.
Figure 5:
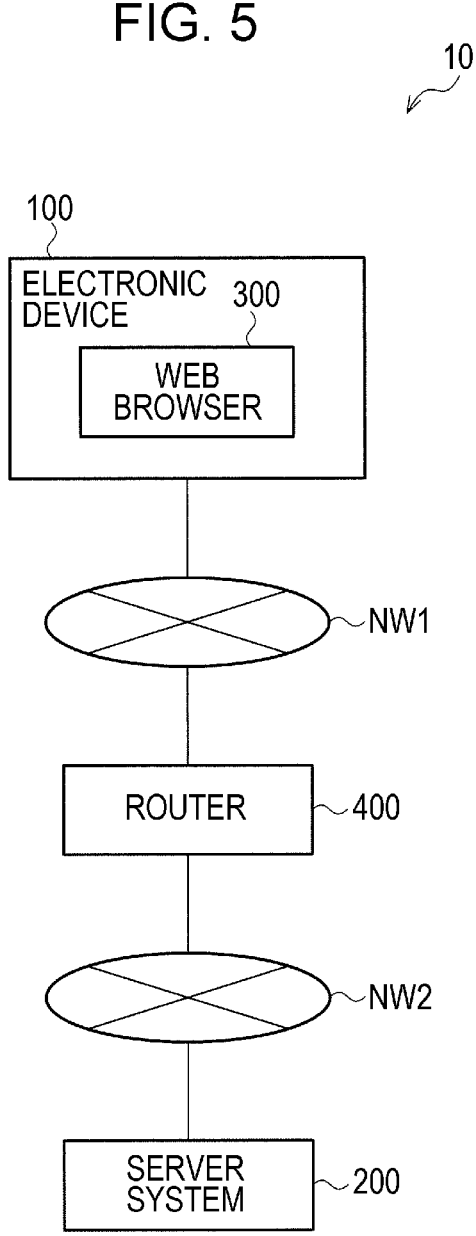
FIG. 5 is a configuration example of a processing system when a web browser is included in an electronic device.

FIG. 4 and FIG. 5 are diagrams illustrating specific examples of devices in which the web browser 300 is implemented. As illustrated in FIG. 4, the web browser 300 may be included in a processing apparatus 500 that is a different device from the electronic device 100. The processing apparatus 500 may be any device, for example, a PC. Alternatively, as illustrated in FIG. 5, the web browser 300 may be included in the electronic device 100. That is, the processing unit 110 of the electronic device 100 may perform a process of the web browser 300 such as a web API invocation.

For example, one of the conceivable schemes to realize the real-world environment illustrated in FIG. 5 is to provide an integrated development environment (IDE) or the like for the processing apparatus 500 of FIG. 4 to enable development of a web application and subsequent deployment of the produced web application in the server system 200. In such a case, in any type of the processing apparatus 500 in which the web browser 300 is installed, it is possible to develop a web application while checking the actual operation of the electronic device 100. That is, there is little constraint in development of a web application, and conventional development schemes may be widely applied. For example, various widely used IDEs can be used for the processing apparatus 500, which facilitates flexible development and enables a program to be executed on a per-line basis to sequentially check the operation of the electronic device 100. Note that since the electronic device 100 of the present embodiment is not limited to a device incorporating the web browser 300, there is no obstacle for the system illustrated in FIG. 4 to be used as a real-world environment.

2. Web API

As described above, the electronic device 100 according to the present embodiment provides a web API for scan start request used for causing the image reading unit 141 to perform a scan process. The web API for scan start request is associated with a predetermined uniform resource locator (URL), and a scan process is started when the web browser 300 designates a predetermined parameter for the URL and performs access.

FIG. 6 is a diagram illustrating a portion of HTML data transmitted to the web browser 300 by the server system 200. In the example of FIG. 6, the web browser 300 displays a simple page including a "Scan" button, as indicated by B4. When the user presses the Scan button in the web browser 300, a scan function indicated by B1 is performed.

The scan function initializes a request for a predetermined URL via an HTTP POST method, as indicated by B2. The URL in this example is a URL associated with a web API for scan start request. For example, the URL is formed of a character string representing an IP address, a directory, a file name, or the like of the electronic device 100, as indicated by B2. FIG. 6 illustrates an example in which the IP address of the electronic device 100 is 192.0.2.1. When the web browser 300 is included in the electronic device 100 as illustrated in FIG. 5, the IP address included in the URL of B2 is an IP address representing the electronic device 100. Note that various modifications can be made to a URL, and a modification to replace an IP address with a domain name is possible, for example. Then, as indicated by B3, the scan function transmits a request with an attached parameter that designates a scan setting such as a scan size. The portion "xxx" is source code conforming to an Extensible Markup Language (XML) format, for example, which is information that associates a scan item with a setting value of each item.

When receiving a request from the web browser 300, the processing unit 110 of the electronic device 100 causes the image reading unit 141 to perform a scan process in accordance with a setting designated in B3. By implementing a web application that transmits HTML data illustrated in FIG. 6 to the web browser 300 in a suitable situation, it is possible to use the scan function of the electronic device 100 from the server system 200. Note that FIG. 6 illustrates one example of HTML data used for accessing the scan function, and various modifications can be made to the form of a displayed page or the specific content described in a script language.

Further, the electronic device 100 according to the present embodiment provides a web API for print request used for causing the printing unit 142 to perform a print process. The web API for print request is associated with a predetermined URL that is different from that of the web API for scan start request, and a print process is started when the web browser 300 designates a predetermined parameter for the URL for access. For example, as with FIG. 6, a script used for transmitting a request to the URL corresponding to the web API for print request is included in HTML data transmitted from the server system 200 to the web browser 300. Accordingly, it is possible to use the print function of the electronic device 100 from the server system 200.

Note that the web API for print request may be a web API feature that provides for both an instruction to create a print job and transmission of print data used for executing the print job. In such a case, the web browser 300 that invokes a web API for print request needs to acquire print data from the server system 200 in advance. Alternatively, the web API for print request may be a web API that provides an instruction to create a print job, and print data may be acquired by the electronic device 100 transmitting an acquisition request directly to the server system 200. Details of respective processes will be described later.

Further, the function provided by the electronic device 100 through a web API is not limited to the scan function or the print function. For example, when a web API for status information request provided by the electronic device 100 is invoked by a process of the web browser 300, the communication unit 120 of the electronic device 100 transmits status information on the electronic device 100 back to the web browser 300 as a response to the invocation of the web API for status information request. Specifically, the processing unit 110 acquires status information on the electronic device 100 and causes the communication unit 120 to transmit the status information to the web browser 300.

In such a way, status information on the electronic device 100 may be transmitted back to the web browser 300 as a response to a web API invocation via the web browser 300. In the scheme of the present embodiment, the web browser 300 is assumed to be a typical browser. It is therefore difficult for the web browser 300 to accept an external request.

The communication from the electronic device 100 to the web browser 300 indicated by A2 in FIG. 3 is realized by providing a virtual keyboard driver, for example. When a request is performed from the electronic device 100, the web browser 300 recognizes the request as an operation on the keyboard. However, complex information, for example, XML data or JavaScript (registered trademark) Object Notation (JSON) data has a significantly large number of characters. Thus, when a virtual keyboard driver is used to transmit XML data or the like, control for recognizing that key presses corresponding to the number of characters is necessary, and such control is complex. Further, since the communication indicated by A2 may be realized by using a scheme other than a virtual keyboard driver, a mechanism for the scheme needs to be prepared.

In contrast, since the communication from the web server 300 to the electronic device 100 indicated by A1 in FIG. 3 is typical HTTP or HTTPS communication, status information is used more easily than in the communication of A2. That is, it is possible to easily realize transmission of status information to the web browser 300 by providing a web API for status information request and invoking the web API status information request from the web browser 300. Since it is possible to update a displayed page via the web browser 300 by transmitting status information to the web browser 300, it is possible to suitably notify the user of the status of the electronic device 100. Further, as indicated by A3 in FIG. 3, since communication from the web browser 300 to the server system 200 is easily established, status information on the electronic device 100 can be transferred to and accumulated in the server system 200.

3. Process Flow

Next, the authentication process, the scan process, and the print process will be described in detail.

3.1 Authentication Process

Figure 7:
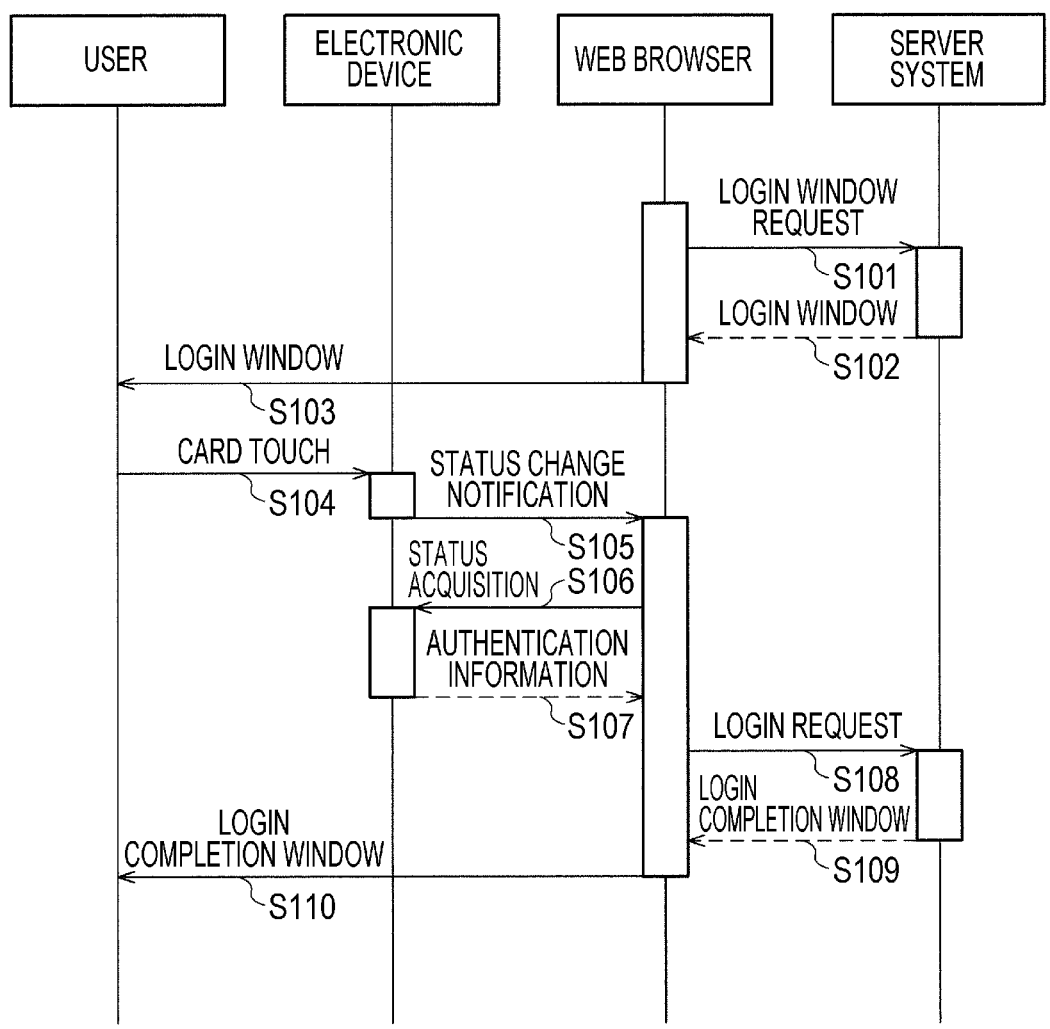
FIG. 7 is a sequence diagram illustrating an authentication process.

FIG. 7 is a sequence diagram illustrating an authentication process for performing user authentication. That is, the server system 200 in this case is an authentication server that performs user authentication in accordance with communication via the web browser 300. Note that each solid-line arrow in FIG. 7 represents an active request transmission, and each dashed-line arrow represents a response to the request. The same applies to the sequence diagram of FIG. 8 and subsequent diagrams.

Once the process is started, first, the web browser 300 requests a login window from the server system 200 (S101). Step S101 is a process for designating a predetermined URL corresponding to a login window and transmit an acquisition request to the server system 200. The server system 200 transmits information on the login window as a response to the request of step S101 (S102). A response by the server system 200 such as step S102 refers to a response in HTML or script format. The web browser 300 displays a login window to be presented to the user in accordance with HTML data or the like received in step S102 (S103). The login window is a window that prompts the user to operate a card reader to read an authentication card, for example. However, the login window is not limited to the above. For example, when an authentication process is performed by using a combination of a user name and a password, the login window may be a window that prompts the user to input a user name and a password.

The user performs a login operation in accordance with the displayed login window. The login operation is a touch operation using an authentication card, for example (S104). The card reader is coupled to the electronic device 100 by using a predetermined connection interface. The processing unit 110 of the electronic device 100 acquires, from the authentication card, authentication information read by the card reader. The electronic device 100 notifies the web browser 300 of a status change in response to the acquisition of user authentication information as a trigger (S105). The notification of step S105 is performed by using the virtual keyboard driver described above, for example. The notification of step S105 is to notify the user of the occurrence of a status change but not notify the user of the content of authentication information. Thus, for example, the virtual keyboard driver causes the web browser 300 to recognize a notification from the electronic device 100 as a simple key operation such as the enter key being pressed once.

The web browser 300 requests acquisition of status information from the electronic device 100 by invoking a web API for status information request in accordance with the notification of step S105 (S106). For example, a process for accessing a URL corresponding to the web API for status information request when an event of pressing the enter key occurs is implemented in the web application of the server system 200. The status information in this example is user authentication information.

The communication unit 120 of the electronic device 100 transmits the authentication information back to the web browser 300 as a response to the invocation of the web API for status information request (S107). As described above, the process of step S107 is a process performed when user authentication information is acquired. Accordingly, the authentication information acquired by the electronic device 100 can be transmitted to the web browser 300 by using a web API.

Note that, in the example of FIG. 7, the processing unit 110 of the electronic device 100 performs a process for notifying the web browser 300 of a status change when the status change of the electronic device 100 is detected as illustrated in step S105. Accordingly, it is possible to request a web API invocation via the web browser 300 on the electronic device 100 side. The electronic device 100 detects a status change when accepting a user operation, for example. The user operation is a login operation illustrated in step S104, for example, but is not limited thereto. For example, the electronic device 100 may detect a status change when a process is performed in accordance with a predetermined web API, as described later. Specifically, the electronic device 100 detects completion of a scan process in accordance with a web API for scan start request or completion of a print process in accordance with a web API for print request as a status change. However, there is no obstacle for the electronic device 100 to detect a status change in accordance with other conditions such as the occurrence of an error. Further, as described later as a modified example, the notification of a status change from the electronic device 100 to the web browser 300 may be omitted.

The web browser 300 transmits a login request to the server system 200 in accordance with the authentication information acquired from the electronic device 100 in step S107 (S108). The server system 200 that is an authentication server performs a user authentication process in accordance with the authentication information acquired in step S108. Since known schemes may be widely applied for a user authentication process in the server system 200, detailed description thereof will be omitted. When user authentication is performed, the server system 200 transmits to the web browser 300 information used for displaying a login completion window in the web browser 300 (S109). The web browser 300 displays the login completion window in accordance with the information acquired from the server system 200 (S110).

Figure 8:
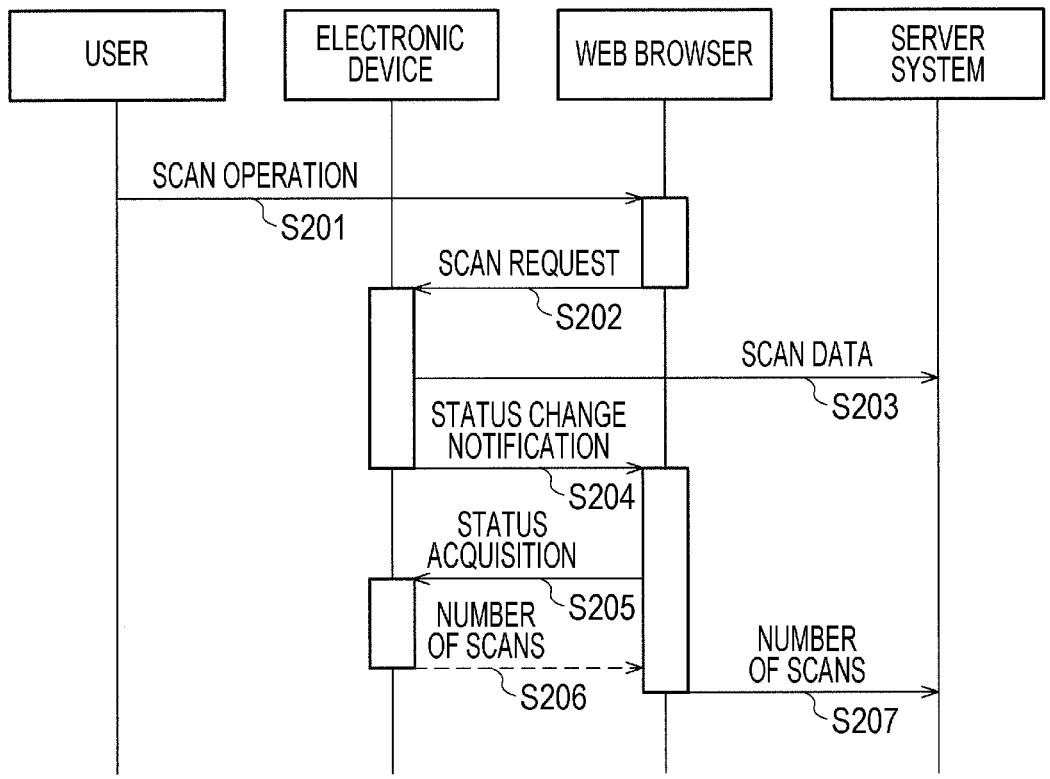
FIG. 8 is a sequence diagram illustrating a scan process.
Figure 9:
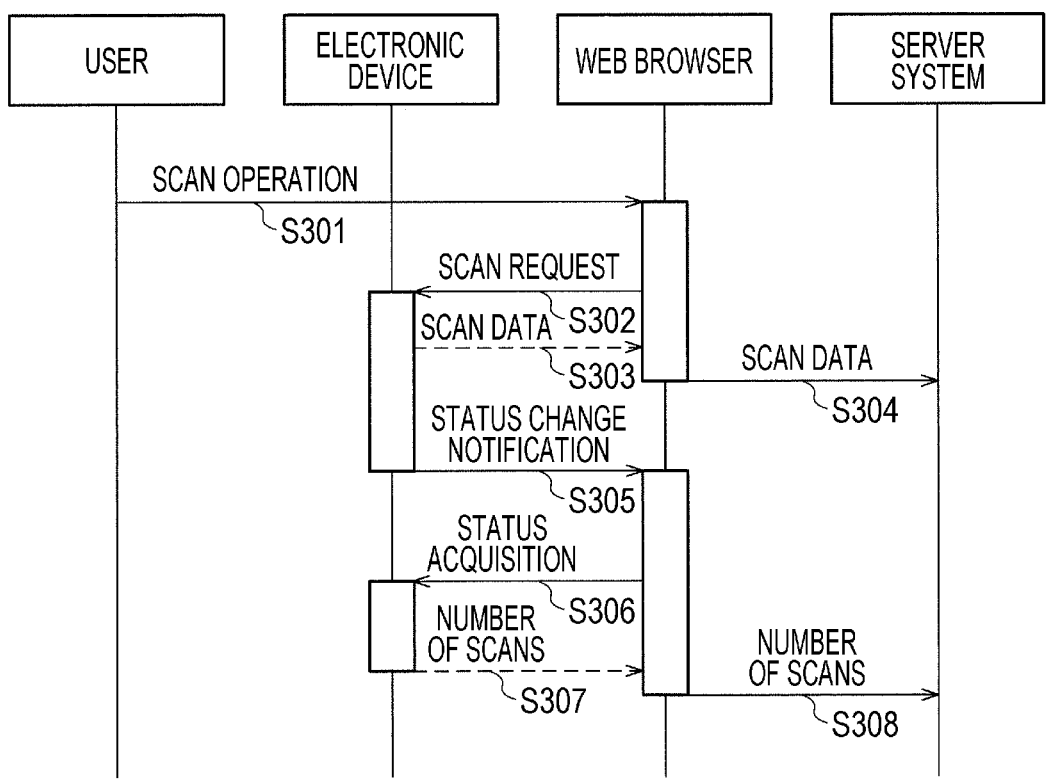
FIG. 9 is another sequence diagram illustrating a scan process.
Figure 10:
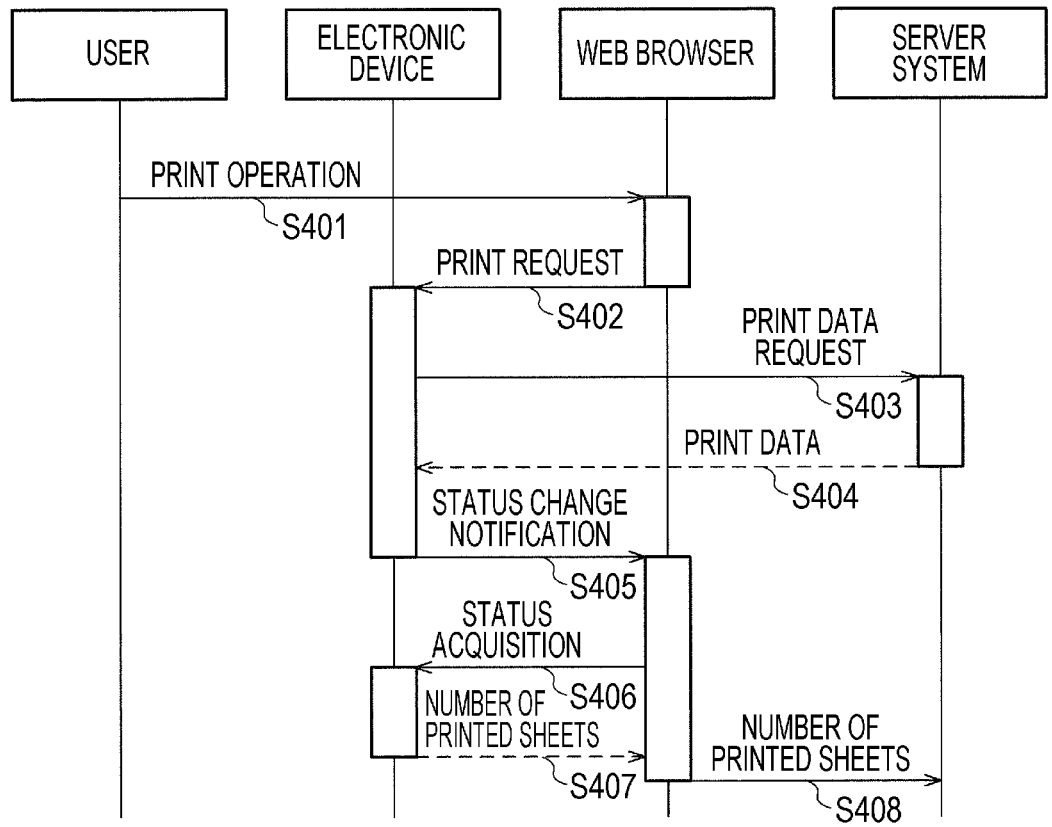
FIG. 10 is a sequence diagram illustrating a print process.
Figure 11:
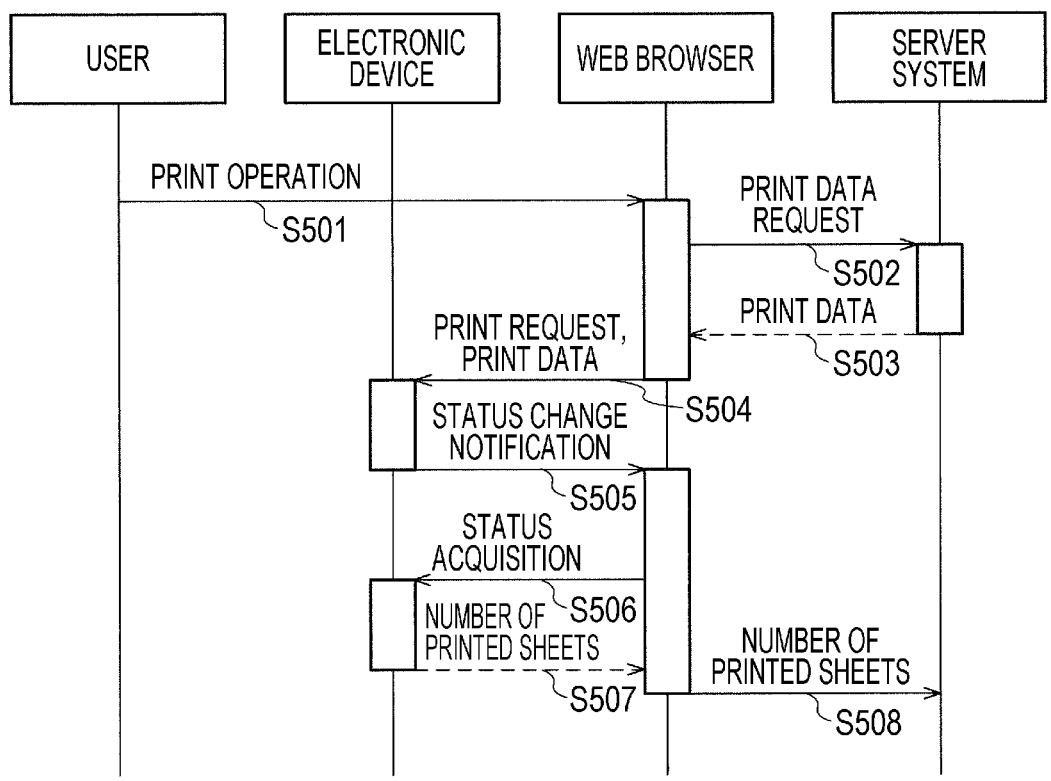
FIG. 11 is another sequence diagram illustrating a print process.

As illustrated in FIG. 7, according to the scheme of the present embodiment, an authentication process may be realized as an application of the server system 200, and extension of the function of the electronic device 100 is thus facilitated. Furthermore, data transmission and reception between the electronic device 100 and the server system 200 is realized via the web browser 300 that is a standard browser. When the process illustrated in FIG. 7 and the process described later by using FIG. 8 and FIG. 9 are combined, an authentication scan process is realized. Further, when the process illustrated in FIG. 7 and the process described later by using FIG. 10 and FIG. 11 are combined, an authentication print process is realized.

3.2 Scan Process

Next, the scan process will be described. Transmission of scan data from the electronic device 100 to the server system 200 may be performed directly or may be performed via the web browser 300. Respective processes will be described by using FIG. 8 and FIG. 9.

FIG. 8 is a sequence diagram illustrating the scan process. The process illustrated in FIG. 8 is performed after the process illustrated in FIG. 7, for example. Once the process is started, the user performs a scan operation by using the web browser 300 (S201). The scan operation in step S201 is an operation of pressing the Scan button in a window displayed in the web browser 300 in accordance with HTML data illustrated in FIG. 6, for example.

The web browser 300 requests the electronic device 100 for a scan in accordance with the scan operation (S202). The process of step S202 is an invocation of the web API for scan start request as indicated by B2 and B3 in FIG. 6.

The processing unit 110 of the electronic device 100 causes the image reading unit 141 to perform a scan process in accordance with the invocation of the web API for scan start request. When scan data is acquired upon completing the scan process, the communication unit 120 of the electronic device 100 transmits the scan data directly to the server system 200 (S203). As indicated by A4 in FIG. 3, communication from the electronic device 100 side to the server system 200 is enabled. When scan data is transmitted directly to the server system 200, it is possible to accumulate the scan data in the server system 200 by using simple communication control. Note that the server system 200 accepts an acquisition request for scan data and transmits back the scan data as a response to the acquisition request, and thereby, various devices can use the scan data.

Note that the user is likely to be interested in information regarding a scan result, such as the number of documents processed in a scan process or whether or not a scan process completed normally. It is therefore desirable to use the web browser 300 to display a window presenting the scan result rather than to end the process by the transmission of scan data to the server system 200.

Therefore, the electronic device 100 determines that a status change is detected when a process based on a web API is performed, specifically, when a scan process based on the web API for scan start request is completed. The electronic device 100 notifies the web browser 300 of the status change (S204). The web browser 300 requests the electronic device 100 to acquire status information by invoking a web API for status information request in accordance with the notification of step S204 (S205).

The communication unit 120 of the electronic device 100 transmits the status information back to the web browser 300 as a response to the invocation of the web API for status information request (S206). The status information in this example is information indicating the number of scans performed in the image reading unit 141. Accordingly, it is possible to transmit status information indicating a scan result to the web browser 300 by using a web API. For example, the web browser 300 performs a display process of displaying information indicating a scan result, such as the number of scans. Further, the web browser 300 transmits information, such as the number of scans, to the server system 200 (S207). Accordingly, it is possible to accumulate information other than scan data, which is image data, in the server system 200. The information of the number of scans may be used for management of the electronic device 100 or for a billing process for billing the user, for example.

Further, FIG. 9 is another sequence diagram illustrating the scan process. The process illustrated in FIG. 9 is performed after the process illustrated in FIG. 7, for example. A scan operation performed by the user (S301) and a scan request made by the web browser 300 (S302) are the same as the processes illustrated in FIG. 8.

In the example of FIG. 9, the communication unit 120 of the electronic device 100 transmits scan data to the server system 200 via the web browser 300. For example, the communication unit 120 transmits a scan result to the web browser 300 as a response to the invocation of the web API for scan start request illustrated in step S302 (S303). The web browser 300 transmits the received scan data to the server system 200 (S304). Accordingly, it is possible to transmit scan data to the server system 200 via the web browser 300. A thumbnail image of scan data can be displayed in the web browser 300, if necessary. In this case, it is possible to suppress the number of request transmissions by using transmissions of scan data from the electronic device 100 to the web browser 300 as responses to the invocation of the web API for scan start request.

Note that various modifications can be made to the configuration of the web API. For example, the web API for scan start request may be an API feature that causes the image reading unit 141 to perform a scan process as in the example of FIG. 8 and that does not transmit back scan data. Further, the electronic device 100 may provide a web API for scan data request that is a web API feature used for scan data acquisition independently of the web API for scan start request. In such a case, the web API for scan data request provided by the electronic device 100 is invoked by a process of the web browser 300 after the web API for scan start request is invoked. The communication unit 120 of the electronic device 100 transmits scan data to the web browser 300 as a response to the invocation of the web API for scan data request. Accordingly, a function of starting a scan process and a function of acquiring scan data may be provided as separate web API functions.

Note that, since steps S305 to S308 of FIG. 9 are the same as steps S204 to S207 of FIG. 8, detailed description thereof will be omitted.

3.3 Print Process

Next, the print process will be described. The print process in the printing unit 142 requires print data including print image data. The print data is accumulated in the server system 200, for example. The print data may be transmitted from the web browser 300 as a web API parameter when the web browser 300 invokes a web API for print request of the electronic device 100. Alternatively, the web API for print request may provide a printing instruction, and transmission and reception of print data may be performed between the electronic device 100 and the server system 200. Respective processes will be described by using FIG. 10 and FIG. 11.

FIG. 10 is a sequence diagram illustrating the print process. The process illustrated in FIG. 10 is performed after the process illustrated in FIG. 7, for example. Once this process is started, the user performs a print operation via the web browser 300 (S401). The print operation is an operation of pressing a print button in a window displayed in the web browser 300, for example. The web browser 300 requests the electronic device 100 for printing in accordance with the print operation (S402). The process of step S402 is an invocation of the web API for print request.

The communication unit 120 of the electronic device 100 then transmits an acquisition request for print data to the server system 200 in accordance with the web API for print request (S403). The server system 200 then transmits print data back to the electronic device 100 as a response to the acquisition request (S404). In other words, the communication unit 120 of the electronic device 100 receives print data from the server system 200 as a response to the acquisition request described above. The processing unit 110 causes the printing unit 142 to print the acquired print data. This enables direct transmission and reception of print data between the electronic device 100 and the server system 200.

Further, when a process based on the web API is performed, specifically, when a print process based on the web API for print request is completed, the electronic device 100 determines that a status change is detected. The electronic device 100 notifies the web browser 300 of the status change (S405). The web browser 300 requests the electronic device 100 to acquire status information by invoking a web API for status information request in accordance with the notification of step S405 (S406).

The communication unit 120 of the electronic device 100 transmits the status information back to the web browser 300 as a response to the invocation of the web API for status information request (S407). The status information in this example is information indicating the number of printed sheets or the number of printed pages in the printing unit 142. The number of printed sheets refers to the number of printing media used in printing. In counting the number of printed sheets, whether printing on a given printing medium is single-sided printing or double-sided printing, the printing medium is counted as one sheet. The number of printed pages distinguishes a front side from a back side of a printing medium. That is, even with a single printing medium, the number of printed pages is one page in the case of single-sided printing and two pages in the case of double-sided printing.

Accordingly, status information indicating a print result in the electronic device 100 may be transmitted to the web browser 300 by using a web API. The web browser 300 transmits information on the number of printed sheets or the like to the server system 200 (S408). As with the example of a scan result, the web browser 300 may perform a display process of displaying a print result such as the number of printed sheets or the number of printed pages. The information on the number of printed sheets or the number of printed pages may be used for management of the electronic device 100 or for a billing process for billing the user, for example. For example, when billing is performed while taking consumption of ink or toner into consideration, the number of printed pages is useful. On the other hand, when the printing medium is expensive, the number of printed sheets enables an appropriate billing process.

Further, FIG. 11 is another sequence diagram illustrating the print process. The process illustrated in FIG. 11 is performed after the process illustrated in FIG. 7, for example. The process illustrated in FIG. 11 is the same as that illustrated in FIG. 10 in that the process starts with a print operation performed by the user (S501).

In the example of FIG. 11, in response to a print operation performed by the user, the web browser 300 acquires print data from the server system 200 before invoking the web API for print request. Specifically, the web browser 300 requests print data from the server system 200 (S502). The server system 200 transmits back print data as a response to the request of step S502 (S503). Steps S502 and S503 are a request and a response in HTTP or HTTPS.

The web browser 300 then invokes a web API for print request by using the acquired print data as a parameter. In other words, in accepting the invocation of the web API for print request by the web browser 300, the communication unit 120 of the electronic device 100 receives, from the web browser 300, the print data acquired from the server system 200 by the web browser 300. This enables the electronic device 100 to acquire print data accumulated in the server system 200 via the web browser 300. The electronic device 100 causes the printing unit 142 to perform printing of the print data in accordance with the invoked web API for print request.

Note that, since steps S505 to S508 of FIG. 11 are the same as steps S405 to S408 of FIG. 10, detailed description thereof will be omitted.

4. Modified Examples

The process illustrated in steps S204 to S207 of FIG. 8 has been described above as a scheme to transmit status information on the electronic device 100 to the server system 200. Specifically, the web browser 300 is notified of a status change from the electronic device 100 side, and thereby the web browser 300 is caused to invoke a web API for status information request. However, the scheme to transmit status information to the web browser 300 and the server system 200 is not limited to the above.

For example, the web browser 300 may periodically invoke the web API for status information request. Then, when a status change such as acquisition of authentication information or the like occurs, the electronic device 100 transmits the status information back to the web browser 300 as a response to the invocation of the web API for status information request. In such a case, while it is necessary to perform invocation via a web API periodically from the web browser 300 side, it is not necessary to transmit a request as indicated by A2 in FIG. 3 from the electronic device 100 to the web browser 300. Thus, it is not necessary to use a virtual keyboard driver or the like, and there is an advantage of easier implementation.

Alternatively, when ease of communication indicated by A4 in FIG. 3 is focused on, the electronic device 100 may inform the server system 200 that a status change has been detected. The web browser 300 uses communication indicated by A3 to periodically perform a request for long polling or polling on the server system 200. When there is a notification of a status change, the server system 200 notifies the web browser 300 of the detection of the status change as a response to the long polling request or the polling. Accordingly, it is possible to notify the web browser 300 of a status change of the electronic device 100 via the server system 200. The web browser 300 invokes a web API for status information request in accordance with the notification of the status change.

In addition, the status information on the electronic device 100 is not limited to that transmitted as a response to the invocation of the web API for status information request. For example, the communication indicated by A2 may be used to transmit the specific content of a status change from the electronic device 100 to the web browser 300. Given the control of the virtual keyboard driver or the like, however, it is to be noted that transmission of complex status information is complex.

Alternatively, the electronic device 100 may use the communication indicated by A4 to transmit the specific content of a status change to the server system 200. The web browser 300 uses the communication indicated by A3 to periodically perform a long polling request or polling on the server system 200. When receiving information regarding a status change from the electronic device 100, the server system 200 transmits information regarding the status change to the web browser 300 as a response to the long polling request or the polling. Accordingly, it is possible to realize a process for accumulating status information in the server system 200 by using the communication indicated by A4. Further, since it is possible to transmit status information to the web browser 300 by using the communication indicated by A3 and a response thereto, it is possible to realize a display process or the like of displaying the status information in the web browser 300.

As described above, the electronic device of the present embodiment includes a communication unit, a processing unit that controls the communication unit, and an image reading unit. The processing unit causes the image reading unit to start a scan process in accordance with a web API for scan start request when the web API for scan start request provided by the electronic device is invoked by a process of a web browser configured to communicate with a server system. The processing unit causes the communication unit to transmit scan data acquired by the image reading unit to the server system.

In such a way, in a system in which scan data acquired by a scan process in the electronic device is transmitted to the server system, it is possible to use a scan function of the electronic device via a web browser by using a web API. That is, the server system is able to control the electronic device via a web browser, and extension of the functionality of the electronic device is facilitated. Further, since the web API is supported in a widely used standard browser, the web browser is not required to be a dedicated browser. It is therefore possible to reduce the burden in developing a browser and the burden in developing an application on the server system side.

Further, the communication unit may transmit scan data directly to the server system.

Accordingly, it is possible to accumulate scan data in the server system in accordance with communication with the electronic device and the server system.

Further, the communication unit may transmit scan data to the server system via the web browser.

Accordingly, it is possible to accumulate scan data in the server system by routing the scan data via the web browser.

Further, the communication unit may transmit scan data to the web browser as a response to an invocation of a web API for scan start request.

Accordingly, a scan process may be started and scan data may be transmitted in accordance with the web API for scan start request.

Further, the communication unit may transmit scan data to the web browser as a response to an invocation of a web API for scan data request when the web API for scan data request provided by the electronic device is invoked by the web browser after the web API for scan start request is invoked.

Accordingly, scan data may be transmitted to the web browser in response to the web API for scan data request that is different from the web API for scan start request.

Further, the electronic device of the present embodiment includes a communication unit, a processing unit that controls the communication unit, and a printing unit. The processing unit causes the printing unit to perform a print process of print data in accordance with a web API for print request when the web API for print request provided by the electronic device is invoked by a process of a web browser configured to communicate with a server system that accumulates print data.

In such a way, in a system in which the server system accumulates print data used for a print process in the electronic device, it is possible to use a print function of the electronic device from a web browser by using a web API. That is, the server system is able to control the electronic device via the web browser, and extension of the functionality of the electronic device is facilitated. Further, since the web API is supported in widely used standard browsers, the web browser is not required to be a dedicated browser. It is therefore possible to reduce the burden in developing a browser and the burden in developing an application on the server system side.

Further, the communication unit may receive, from the web browser, print data acquired from the server system by the web browser in accepting the invocation of a web API for print request by the web browser.

This enables the electronic device to acquire print data as a parameter in the invocation of the web API.

Further, the communication unit may receive print data as a response to an acquisition request after transmitting the acquisition request for print data to the server system in accordance with the web API for print request.

This enables the electronic device to request print data from the server system in response to the invocation of the web API as a trigger.

Further, the communication unit may transmit status information on the electronic device back to the web browser as a response to an invocation of a web API for status information request when the web API for status information request provided by the electronic device is invoked by a process of the web browser.

Accordingly, status information on the electronic device may be transmitted to the web browser. Therefore, the status information may be displayed in the web browser, and the status information may be transmitted to and accumulated in the server system.

Further, the processing unit may perform a process for notifying the web browser of a status change when the status change of the electronic device is detected.

Accordingly, an invocation of the web API for status information request may be facilitated in response to the notification from the electronic device as a trigger.

Further, the server system may be an authentication server that performs user authentication in accordance with communication with a web browser. The communication unit of the electronic device may transmit authentication information back to the web browser as a response to an invocation of a web API for status information request when acquiring the authentication information on a user.

Accordingly, authentication information on the user acquired by the electronic device may be transmitted to the server system suitably via the web browser.

Further, the communication unit may transmit status information on the electronic device back to the web browser as a response to an invocation of a web API for status information request when the web API for status information request provided by the electronic device is invoked by a process of the web browser. The status information here is information indicating the number of scans in the image reading unit.

Accordingly, information indicating the number of scans may be transmitted to the web browser and accumulated in the server system via the web browser.

Further, the communication unit may transmit status information on the electronic device back to the web browser as a response to an invocation of a web API for status information request when the web API for status information request provided by the electronic device is invoked by a process of the web browser.

Accordingly, information indicating the number of printed sheets or the number of printed pages may be transmitted to the web browser and accumulated in the server system via the web browser.

Further, the processing unit may invokes a process of the web browser.

This enables the electronic device to include the web browser.

Further, the image reading method of the present embodiment invokes a web API for scan start request provided by an electronic device through a process of a web browser configured to communicate with a server system, performs a scan process by using an image reading unit of the electronic device in accordance with the web API for scan start request, and transmits scan data acquired by the image reading unit to the server system.

Further, the print processing method of the present embodiment invokes a web API for print request provided by an electronic device through a process of a web browser configured to communicate with a server system that accumulates print data. The print data is then transmitted to the electronic device by either one of a process for transmitting the print data from the web server to the electronic device in an invocation of the web API for print request and a process for requesting the print data from the electronic device to the server system in accordance with the invocation of the web API for print request. Furthermore, a printing unit of the electronic device is caused to perform a print process of the print data in accordance with the web API for print request.

Note that, although the present embodiment has been described above in detail, those skilled in the art will understand that a number of modifications not substantially departing from the novel items and advantages of the present disclosure are possible. Therefore, all such modifications are intended to be included in the scope of the present disclosure. For example, in the specification or the drawings, a term stated with a boarder or analogous different term may be replaced with such a different term in any part in the specification or the drawings. Further, all the combinations of the present embodiment and modifications are included in the scope of the present disclosure. Further, the configuration, the operation, and the like of an electronic device or a processing system are not limited to those described in the present embodiment, and various modifications thereto are possible.

What is claimed is:

1. An electronic device comprising:
a communication unit;
a processing unit that controls the communication unit; and
an image reading unit, wherein
the electronic device provides a first web application programming interface (web API),
the communication unit receives a scan start request from a browser, the scan start request comprising a predetermined URL associated with a scan process of the first web API and a parameter that designates a scan setting in an Extensible Markup Language (XML) format,
the browser being configured to communicate with a server system,
the URL includes an IP address of the electronic device,
the scan setting is associated with a scan item,
the browser is configured to receive a Hypertext Markup Language (HTML) file from the server system,
the HTML file includes the predetermined URL and the parameter that designates the scan setting,
the HTML file also causes the browser to display a page having a scan button,
when a user presses the scan button, the browser is caused to send the scan start request to the communication unit, and
in response to receiving the scan start request, the processing unit
causes the image reading unit to start the scan process,
causes the communication unit to transmit scan data acquired by the image reading unit to the server system, and
causes the communication unit to transmit a current status of the scan process to the browser, which in turn transmits the current status of the scan process to the server system.

2. The electronic device according to claim 1, wherein the communication unit transmits the scan data directly to the server system.

3. The electronic device according to claim 1, wherein the communication unit transmits the scan data to the server system via the web browser.

4. The electronic device according to claim 3, wherein the communication unit transmits the scan data to the web browser as a response to an invocation of the first web API for scan start request.

5. The electronic device according to claim 3, wherein the communication unit transmits the scan data to the web browser as a response to an invocation of a second web API for scan data request when the second web API scan for data request provided by the electronic device is invoked by a process of the web browser after the first web API for scan start request is invoked.

6. The electronic device according to claim 1, wherein the communication unit transmits status information on the electronic device back to the web browser as a response to an invocation of a fourth web API for status information request when the fourth web API status for information request provided by the electronic device is invoked by a process of the web browser.

7. The electronic device according to claim 6, wherein the processing unit performs a process for notifying the web browser of a status change when the status change of the electronic device is detected.

8. The electronic device according to claim 6, wherein
the server system is an authentication server that performs user authentication in accordance with communication with the web browser, and
the communication unit transmits information associated with the user authentication back to the web browser as a response to an invocation of the fourth web API for status information request when user authentication information is received.

9. The electronic device according to claim 1, wherein
the communication unit transmits status information on the electronic device back to the web browser as a response to an invocation of a fourth web API for status information request when the fourth web API for status information request provided by the electronic device is invoked by a process of the web browser, and
the status information is information indicating a number of scans in the image reading unit.

10. The electronic device according to claim 1, wherein the processing unit invokes a process of the web browser.

11. An electronic device comprising:
a communication unit;
a processing unit that controls the communication unit; and
a printing unit, wherein
the electronic device provides a third web application programming interface (web API),
the communication unit receives a print request from a browser, the print request comprising a predetermined URL associated with a print process of the third web API and a parameter that designates a print setting in an Extensible Markup Language (XML)

format, and the browser being configured to communicate with a server system that accumulates print data, the URL includes an IP address of the electronic device, the print setting is associated with a print item, the browser is configured to receive a Hypertext Markup Language (HTML) file from the server system, the HTML file includes the predetermined URL and the parameter that designates the print setting, the HTML file also causes the browser to display a page having a print button, when a user presses the print button, the browser is caused to send a print start request to the communication unit, in response to receiving the print request, the processing unit causes the printing unit to perform the print process of printing the print data, and causes the communication unit to transmit a current status of the print process to the browser, which in turn transmits the current status of the print process to the server system.

12. The electronic device according to claim 11, wherein the communication unit receives, from the web browser, the print data acquired from the server system by the web browser on accepting an invocation of the third web API for print request by the web browser.

13. The electronic device according to claim 11, wherein the communication unit receives the print data as a response to an acquisition request after transmitting the acquisition request for the print data to the server system in accordance with the third web API for print request.

14. The electronic device according to claim 11, wherein the communication unit transmits status information on the electronic device back to the web browser as a response to an invocation of a fourth web API for status information request when the fourth web API for status information request provided by the electronic device is invoked by a process of the web browser, and the status information is information indicating a number of printed sheets or a number of printed pages in the printing unit.

15. An image reading method comprising:

providing a first web application programming interface (web API) or a third web API by an electronic device, receiving a scan start request or a print request from a browser, the scan start request comprising a first predetermined URL associated with a scan process of the first web API and a first parameter that designates a scan setting in an Extensible Markup Language (XML) format, or the print request comprising a second predetermined URL associated with a print process of the third web API and a second parameter that designates a print setting in an XML format, and the browser being configured to communicate with a server system; wherein:

the first URL includes an IP address of a scanning device, the scan setting is associated with a scan item, the second URL includes an IP address of a printing device, the print setting is associated with a print item, the browser is configured to receive a Hypertext Markup Language (HTML) file from the server system, the HTML file includes (1) the first URL and the first parameter or (2) the second URL and the second parameter, the HTML causes the browser to display a page having a scan button or a print button; and when a user presses the scan button or the print button, the browser is caused to send the scan start request or the print start request to a communication unit, and in response to receiving the scan start request or the print request, performing the scan process or the print process at the electronic device, and transmitting a current status of the print process or the scan process to the web browser, which in turn transmits the current status of the print process or the scan process to the server system wherein the scan process is a process for transmitting scan data acquired by an image reading unit of the electronic device to the server system, and the print process is a process for acquiring print data to perform printing by performing either one of a process for transmitting print data from the web browser to the electronic device in an invocation of the third web API for print request or a process for requesting print data from the electronic device to the server system in accordance with an invocation of the third web API for print request.

* * * * *